Nov. 25, 1947.  R. R. BEEZLEY  2,431,363
TIRE BULGE GAUGE
Filed March 25, 1946  3 Sheets-Sheet 1
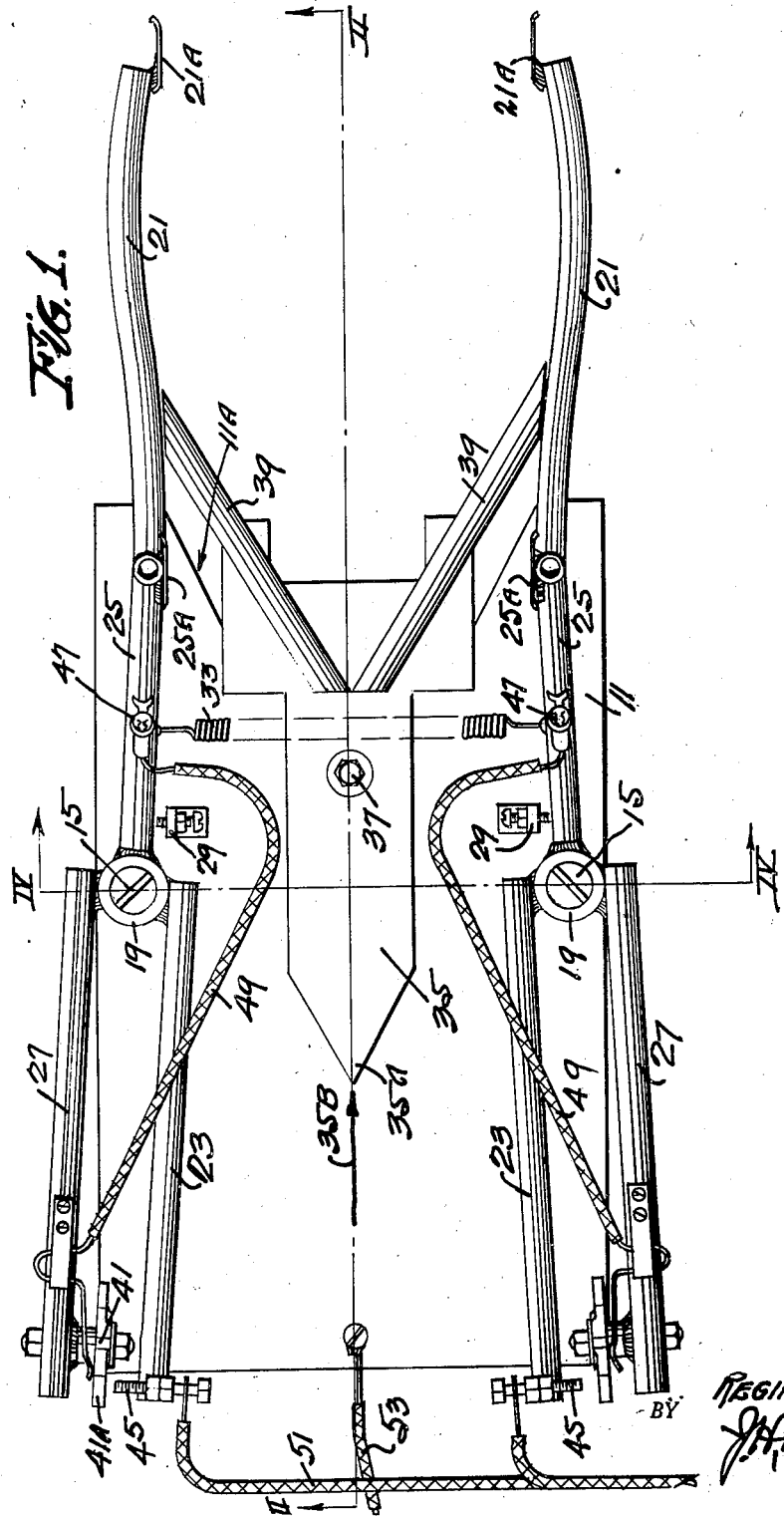
INVENTOR.
REGINALD R. BEEZLEY
BY J. H. Weatherford
Atty

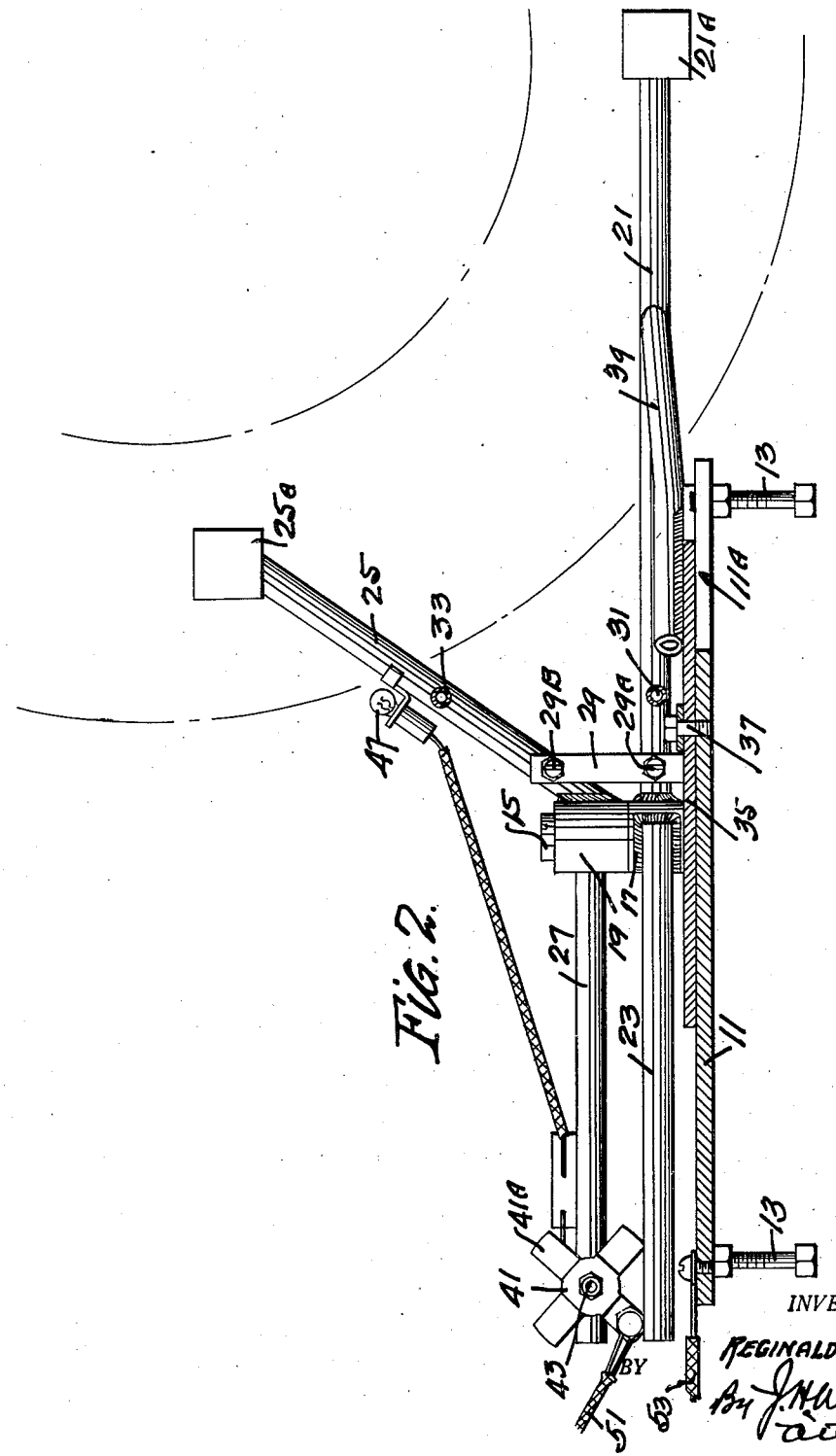

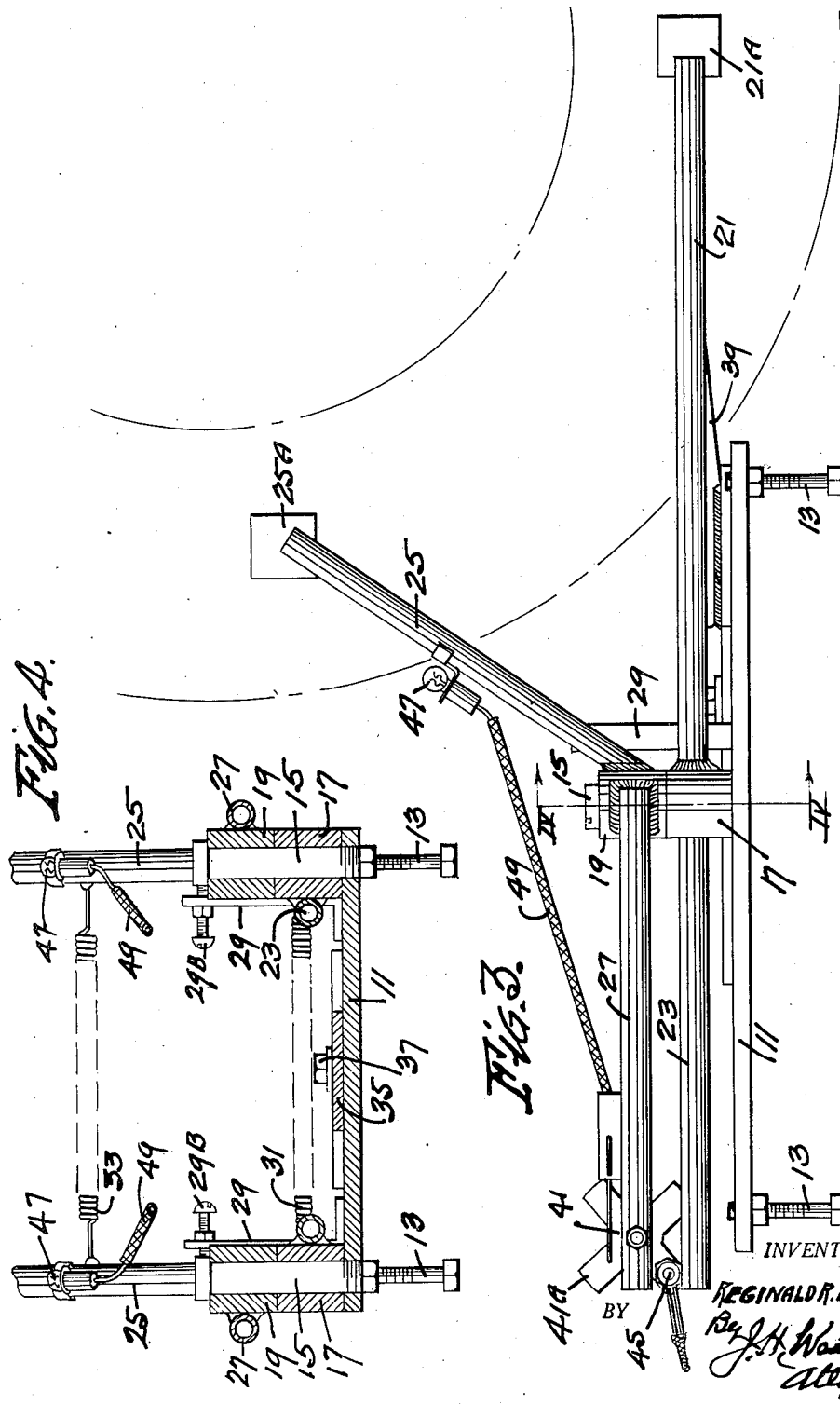

Patented Nov. 25, 1947

2,431,363

UNITED STATES PATENT OFFICE 2,431,363

TIRE BULGE GAUGE

Reginald R. Beezley, Memphis, Tenn.

Application March 25, 1946, Serial No. 656,994

6 Claims. (Cl. 33—174)

This invention relates to gauges for checking pneumatic vehicle tires to determine their inflation.

It particularly relates to a gauge which measures the bulge of the tires where they are in contact with the ground, and at another point enabling the user to determine whether the tires are properly inflated for the load conditions then existing.

Vehicle tires under load spread or bulge at the point of contact with the ground and are so designed that when properly inflated the tread is flat. Over-inflated the center of the tread takes the load and wear, and under-deflated, the side walls break down.

In usual practice, vehicle tires are inflated to a pre-selected air pressure, usually irrespective of the load to be carried, and even where the correct pressure is chosen the tubes are rarely accurately filled, owing to variation in tire gauges and even more to factors which effect the gauges during use.

The primary objects of the present invention are:

To provide means and methods for testing the tires of a vehicle to determine whether they are properly inflated;

To provide means for testing the inflation of vehicle tires by comparison of the bulge of the tire at the load supporting point with the diameter of the tire at other points.

These objects are primarily accomplished by setting up two pairs of calipers, one positioned to measure the tire close to hub level where there is no load pressure, and the other beneath the axle where the tire bulges under load, and establishing means to visually indicate where the bulge has the proper relation to the tire diameter.

The means by which the foregoing and other objects are accomplished, and the manner of their accomplishments, will readily be understood from the following specification upon reference to the accompanying drawings, in which:

Fig. 1 is a plan view of the gauge.

Fig. 2 is a sectional elevation on the line II—II of Fig. 1.

Fig. 3 is a side elevation; and

Fig. 4 is a transverse sectional elevation on the line IV—IV of Figs. 1 and 3.

Referring now to the drawings in which the various parts are indicated by numerals:

11 is a base which is supported by adjustable feet or legs 13. Secured to and projecting upward from the base are two pivot posts 15, on each of which two sleeves 17 and 19 are oscillatably mounted. Rigidly secured to and projecting substantially horizontally forward from the fronts of the lower sleeves 17 are arms 21 which carry shoes 21A, the shoe on one arm facing the shoe on the other thereof for engagement with the opposite sides of a vehicle wheel to be tested, the construction and length of the arms being such that the shoes are positioned near the center of the vehicle wheel to be tested at about one-half the diameter of the tire above the floor, being adjustable by adjustment of the legs for different tire sizes. Also rigidly secured to the sleeves 17 are arms 23, these arms being tangent to the inner sides of the sleeves and extending rearward therefrom.

Rigidly secured to the fronts of the upper sleeves 19 are arms 25 which carry facing shoes 25A, the arms extending diagonally upward and being of length to position the shoes against the opposite sides of the wheel tire about hub level. From these sleeves also arms 27 extend rearwardly, these arms being rigidly secured to the outer sides of their respective sleeves. Each pair of arms in effect constitutes a pair of calipers which may respectively be designated as bulge and tire calipers.

Brackets 29, secured to the base, extend upward therefrom and are provided with adjustable set screws 29A, 29B which respectively act as stops to limit the inward swing of the arms 21 and 25. The arms 21 are joined by a tension spring 31 and the arms 25 by a tension spring 33, which springs respectively urge the arms 21 against the screws 29A and the arms 25 against the screws 29B.

Oscillatably mounted on the base is a position indicator comprising a plate 35 which lies flat on the base and is pivotally secured thereto by a pin 37, this pin being positioned on the longitudinal center line of the base, preferably slightly forward of the posts 15. The plate having its rear end 35A sharpened to form a pointer which cooperates with a center marking or arrow 35B on the base to indicate centering of the plate.

Mounted on the forward portion of the plate are diverging bars 39 which extend forwardly and form a centering V for engagement with the vehicle tire in placing the gauge for use. Preferably the bars extend slightly upward and are beveled to contact with the inner sides of the arms 21. Preferably the base 11 extends forwardly of the post 15, for stability, and is forwardly notched or cut away at 11A to avoid contact with the vehicle tire.

One pair of arms, preferably the outer arms 27, extend rearwardly from the sleeves 19 and each carries a contact member 41 which is turnably secured to the arm by a bolt 43. The other arms 23 carry each a complementary contact point 45, conveniently threaded for adjustment. The contact members 41 preferably have contact seats 41A, any one of which may be turned into alinement with the related contact point, the various seats being cut away to different depths corresponding to differences in tire plies or thickness to vary their spacing away from the point 45.

47 are signal lights, preferably mounted on the arms 25, these lights being connected through leads 49 to the contact members 41. The contact points 45 are connected through a joint lead 51 to a suitable source of power, which may be a battery or any other power source. The lights 47 are grounded oppositely to the leads 49, through the arms 25, the sleeves 19 and posts 15 to the base. 53 is a return circuit lead to the current source.

The gauges are built for varying sizes of tires, and through the contact seats are adjustable for varying tire thicknesses or plies. The shoes 25A are spaced by adjustment of the set screws 29B to conform to the outside width of the tire to be tested and the contacts 41 turned to bring the thickest of the seats 41A in position to be contacted by the related contact points 45. The shoes 21A are moved apart an amount equal to the tire width plus the desired bulge on the two sides of the tire, and the contact points 45 are adjusted until they contact the seats 41A.

To use the gauge, it is moved into position against the tire which is to be tested, with the bottom shoes 21A against opposite sides of the bulge in the tire, the upper shoes against opposite sides of the tire near hub level and the V formed by the diverging bars 39 in centering contact with the tire. The rear end of the base is then shifted until the centering pointer is on the zero mark. The contact seats 41A corresponding to the ply of the tire to be tested are turned to position in alinement with the related contact points 45. The excessive bulge of the underinflated tire shifts the contact points and seats apart. Air is put into the tire until one light burns. The back end of the gauge is shifted from right to left to see if both lights will burn, if not, then more air is applied until both lights burn simultaneously. At this point the air is correct for the load then being carried by the tire and at the same time it is assured that the gauge is in perfect alinement with the tire. Should both lights initially burn, air may be let out of the tire until one or both go out and the same procedure as above be repeated.

I claim:

1. A gauge for a pneumatic tire including a base, means for centering and positioning said base in fore and aft alinement with a pneumatic tired vehicle wheel, caliper arms pivotally mounted on said base, a first pair of said arms extending to opposite sides of the tire of said wheel substantially at hub level, the second pair of said arms extending to opposite sides of said tire below said hub level, means limiting closure movements of said arms, said arms having extensions rearwardly of said pivot means, the extensions of said second pair of arms being inwardly disposed from the extensions of the other said arms, and movable away therefrom by spread of said second pair of arms, contact seats carried by one said pair of said extensions, complementary contact points carried by the other pair of said extensions, resilient means urging closure of said contact seats and points, and signal means energized by contact of said seats and points.

2. A gauge for a pneumatic tire including a base, means for centering and positioning said base in fore and aft alinement with a pneumatic tired vehicle wheel, a first pair of caliper arms extending forwardly and upwardly to opposite sides of the tire of said wheel in adjacency to hub level of said wheel, a second pair of caliper arms extending forwardly to the opposite bulges of said tire below said hub, vertically disposed pivot means carried by said base hinging the rear ends of said arms, said arms having extensions rearwardly of said pivot means, the extensions of said second pair of extensions being inwardly disposed from the extensions of the other thereof, and movable away therefrom by spread of said second pair of caliper arms, contact seats carried by one said pair of said extensions, complementary contact points carried by the other pair of said extensions, resilient means urging closure of said contact seats and points, and signal means energized by contact of said seats and points.

3. A gauge for a pneumatic tire including a base, means for centering and positioning said base in fore and aft alinement with a pneumatic tired vehicle wheel, a first pair of caliper arms extending forwardly and upwardly to opposite sides of the tire of said wheel in adjacency to hub level of said wheel, a second pair of caliper arms extending forwardly to the opposite bulges of said tire below said hub, vertically disposed pivot means carried by said base hinging the rear ends of said arms, said arms having extensions rearwardly of said pivot means, the extensions of said second pair of extensions being inwardly disposed from the extensions of the other thereof, and movable away therefrom by spread of said second pair of caliper arms, means urging contact of said second pair of calipers with said bulges and the related extensions with the extensions of said first pair of calipers, and means for indicating contacts of said extensions.

4. A gauge for a pneumatic tire including a base, means for centering and positioning said base in fore and aft alinement with a pneumatic tired vehicle wheel, a first pair of caliper arms extending forwardly and upwardly to opposite sides of the tire of said wheel, a second pair of caliper arms extending forwardly to opposite sides of said tire below said hub, vertically disposed pivot means carried by said base hinging the rear ends of said arms, said arms having extensions rearwardly of said pivot means, the extensions of one of said pairs of arms being inwardly disposed from the extensions of the other thereof, and movable away therefrom by spread of said second pair of caliper arms, contact members carried by one said pair of said extensions, complementary contact points carried by the other pair of said extensions, said contact members including like pluralities of seats having differing spacings from said points, resilient means urging engagement of said contact seats and points, and signal means energized by contact of said seats and points.

5. A bulge gage for a pneumatic tire, including two complementary pairs of calipers, means for establishing a setting of a first pair of said calipers to a tire size, means for setting the second pair thereof with relation to said first pair to a desired bulge size of said tire, means mounting the latter said calipers for displacement from its said setting, resilient means urging return to said setting, means for positioning the second pair of said calipers in engagement with the sides of the bulge of a tire under load, and the first thereof in engagement with the sides of said tire away from said bulge, and means indicating establishment of the setting relation of said second pair of arms to the first thereof.

6. A bulge gauge for a pneumatic tire, including two complementary pairs of calipers, a first pair of said calipers being adapted for engagement with a pneumatic tire away from the bulge thereof, means for setting the second said pair with relation to said first pair to a desired bulge increase in size of said tire, the latter said calipers being displaceable away from said setting, resilient means urging return of said second pair to its said setting, means for mounting and positioning the second pair of said calipers in engagement with the sides of the bulge of a tire under load, and the first thereof in engagement with the sides of said tire away from said bulge, and means indicating establishment of said related settings.

REGINALD R. BEEZLEY.

REFERENCES CITED

The following references are of record in the file of this patent:

UNITED STATES PATENTS

| Number | Name | Date |
|---|---|---|
| 611,391 | Pike | Sept. 27, 1898 |
| 1,644,967 | Wettrich | Oct. 11, 1927 |
| 1,816,464 | Briggert | July 28, 1931 |
| 2,018,371 | Long | Oct. 29, 1935 |